| United States Patent [19] | [11] | 3,954,914 |
|---|---|---|
| Rim et al. | [45] | May 4, 1976 |

[54] FLAME RETARDANT ABS AND URETHANE POLYMERS

[75] Inventors: Yong Sung Rim, Cheshire; Walter Nudenberg, Newtown, both of Conn.

[73] Assignee: Uniroyal, Inc., New York, N.Y.

[22] Filed: Jan. 27, 1975

[21] Appl. No.: 544,524

[52] U.S. Cl. .................. 260/880 R; 260/45.7 R; 260/45.75 B
[51] Int. Cl.² .................................................. C08J 3/20
[58] Field of Search ............... 260/2.5 AJ, 45.7 R, 260/45.75 B, 880

[56] References Cited
UNITED STATES PATENTS

| 3,313,763 | 4/1967 | Chreighton et al. | 260/45.75 B |
|---|---|---|---|
| 3,396,201 | 8/1968 | Weil et al. | 260/45.75 B |

*Primary Examiner*—V. P. Hoke
*Attorney, Agent, or Firm*—Bruce F. Jacobs

[57] ABSTRACT

Flame retardant blends of ABS or polyurethanes with 2,2', 3,3',4,4', 5,5',7,7,7',7'-dodecachloro-1,1', 2,2',-5,5',6,6'-octahydro-2,2',5,5'-methanobiphenyl, with or without antimony compounds, are disclosed.

12 Claims, No Drawings

FLAME RETARDANT ABS AND URETHANE POLYMERS

BACKGROUND OF THE INVENTION

1. Field of the Invention

This invention relates to novel fire retardant polymer compositions containing ABS or urethane polymers and 2,2',3,3',4,4',5,5',7,7,7',7'-dodecachloro-1,1',2-,2',5,5',6,6'-octahydro-2,2',5,5'-methanobiphenyl, with or without antimony compounds, and to methods for rendering polymeric materials containing said polymers flame resistant. For convenience, the flame retardant shall be referred to as RIS.

2. Description of the Prior Art

The increased use of polymeric materials, particularly in the building industry, has resulted in increased interest in rendering these materials fire retardant or flameproof. Presently, most commercially available plastics do not possess satisfactory fire retardancy and this inadequacy represents one of the major obstacles to the use of these materials.

The widely accepted fire retardant chemicals now in use with polymeric materials are antimony tri-oxide and organohalogen compounds. Of the organohalogen compounds, the best known are chlorendic anhydride (1,4,5,6,7,7-hexachlorobicyclo[2.2.1]-hept-5-ene-2,3-dicarboxylic anhydride); tetrabromo- or tetrachlorophthalic acid; 1,4'-isopropylidenebis(2,6-dichlorophenol) [tetrachlorobisphenol A] or the corresponding bromine-containing compound; "Chloran" (trademark), i.e., 2,3-dicarboxyl-5,8-endomethylene-5,6,7,8,9,9-hexachloro-1,2,3,4,4a,5,8,8a-octahydronaphthalene anhydride; chlorinated paraffins; and cycloaliphatic chlorine compounds such as the Dechloranes.

These organohalogen compounds have only limited utility in polymer compositions due to a number of disadvantages. For example, when such halogen compounds are incorporated into a polymer, various physical properties of the polymer are modified, e.g., change in melt viscosity, which requires higher processing temperatures, decrease in light stability, decrease in thermal stability, increase in density, adverse effects on heat distortion temperature, etc.

U.S. Pat. No. 3,313,763 discloses the use of RIS as a flame retardant for various polymeric compositions which have "enhanced physical properties such as heat distortion temperature over the properties of the base resin." The polymeric materials mentioned "are the homopolymers and copolymers of unsaturated aliphatic, alicyclic and aromatic hydrocarbons made from such monomers as ethylene, propylene, butene, pentene, hexene, heptene, octene, 2-methylpropene-1, 3-methylbutene-1, 4-methylpentene-1, 4-methylhexene-1, 5-methylhexene-1, bicyclo-(2.2.1)-2-heptene, butadiene, pentadiene, hexadiene, isoprene, 2,3-dimethylbutadiene-1,3,2-methylpentadiene-1,3, 4-vinylcyclohexene, vinylcyclohexene, cyclopentadiene, styrene and methylstyrene and the like". There is no mention in this patent of the use of RIS in ABS or urethane polymers — the subject matter of this invention.

SUMMARY OF THE INVENTION

This invention pertains to the use of RIS, with or without antimony compounds, as a flame retardant for ABS and urethane polymers and compositions therefrom. The present invention is based on the discovery that by the addition of RIS to the ABS or urethane polymers, thermoplastic resin compounds with excellent self-extinguishing properties are produced without significantly altering the desirable physical or chemical properties of the unmodified blends.

DESCRIPTION OF THE PREFERRED EMBODIMENTS

The preparation of 2,2',3,3',4,4',5,5',7,7,7',7'-dodecachloro-1,1',2,2',5,5',6,6'-octahydro-2,2',5,5'-methanobiphenyl is disclosed in U.S. Pat. No. 2,606,910 issued Aug. 12, 1952. For convenience, this compound will be referred to as RIS, which may be prepared by condensing 2 moles of hexachlorocyclopentadiene with one mole of 1,3-butadiene at a temperature below about 200°C. and thereafter recrystallizing the reaction product from toluene. This compound melts at about 238°C.

The expression "ABS polymer" is used herein in its conventional sense to designate the known thermoplastic polymeric compositions containing combined acrylonitrile, butadiene, and styrene, also called ABS resins or ABS graft copolymers, described for example in U.S. Pat. No. 2,439,303, L. E. Daly, Apr. 6, 1948; U.S. Pat. No. 2,600,024, H. Romeyn, Jr. et al., June 10, 1952; U.S. Pat. No. 2,830,773, C. W. Childers, Jan. 21, 1958; U.S. Pat. No. 3,111,501, M. S. Thompson, Nov. 18, 1963; U.S. Pat. No. 3,198,853, R. L. Bergen, Jr., Aug. 3, 1965 and U.S. Pat. No. 3,261,887, J. U. Mann, July 19, 1966. As is well known to those skilled in the art, the ABS plastic may be of the graft copolymer type, or of the physical blend type (polyblend), or a combination of the two. The conventional ABS graft copolymers are made by graft copolymerizing resin-forming monomers, such as styrene and acrylonitrile, on a previously prepared polybutadiene rubber spine, or a butadiene-styrene copolymer rubber spine; in the final graft copolymer the resinous portion and the rubbery portion are in part chemically combined. The so-called graft copolymer in actual practice contains some ungrafted resin, that is, not all of the resin-forming monomers become grafted to the rubbery spine polymer in the course of the graft polymerization process. The graft copolymer may be made by an emulsion polymerization technique, in which a previously prepared latex of polybutadiene or similar rubber, which serves as a spine, is subject to emulsion polymerization conditions with a monomeric mixture of styrene and acrylonitrile emulsified therein. Alternatively, graft copolymer may be prepared by solution polymerization methods, or by so-called bulk-suspension technique. On the other hand, the physical blend type of ABS is typically a mixture of butadiene-acrylonitrile rubber with separately prepared styrene-acrylonitrile resin. Frequently the graft polymer type of ABS includes additional separately prepared styrene-acrylonitrile resin blended with the graft copolymer. Any such type of ABS resin is suitable for use herein. Moreover, if desired, other styrene-type monomer (such as alpha-methylstyrene) may be substituted for some or all of the styrene itself and other acrylic monomers (such as methacrylonitrile, ethyl acrylate, methyl methacrylate) may be substituted for some or all of the acrylonitrile-type monomer.

Since the ABS material has both a rubbery component (e.g., polybutadiene or butadiene-styrene spine or butadiene-acrylonitrile copolymer component) and a resinous component (styrene-acrylonitrile), it may therefore be regarded as a "gum plastic" type of material. Usually the proportion of the rubbery component in the ABS is from 5 to 35 percent, while the proportion of resin is correspondingly from 95 to 65 percent. The overall proportion of acrylonitrile, butadiene and styrene-type monomer usually falls within the ranges: 10 to 40 percent acrylonitrile; 5 to 65 percent butadiene; and 25 to 85 percent styrene.

The M. S. Thompson U.S. Pat. No. 3,111,501, referred to above as disclosing ABS resins of the kind employed in the invention, is directed to the type of ABS made by blending alpha-methylstyrene-acrylonitrile resin with a graft copolymer of styrene and acrylonitrile on polybutadiene. Thus, for example, there may be employed in this invention the compositions made by blending alpha-methylstyrene/acrylonitrile resin (69/31) (Thompson, col. 2, lines 34–35) with a graft copolymer of styrene/acrylonitrile (70/30 ratio) monomers on polybutadiene latex (46 percent styrene/acrylonitrile and 54 percent rubber solids) (Thompson, col. 3, lines 32–37). Thompson also discloses, at col. 1, lines 68–70, that some or all of the styrene in the graft copolymer may be replaced by alpha-methylstyrene. Likewise, Mann U.S. Pat. No. 3,261,887, col. 5, lines 48, 49; col. 10, Tables 6 and 7; col. 11, lines 50, 51, 54, 55 discloses alpha-methylstyrene as the comonomer with butadiene to make alpha-methylstyrene-butadiene copolymer spine for grafting, while Grabowski U.S. Pat. No. 3,130,177, col. 4, lines 13–15, discloses replacement of the styrene, in part or entirely, by alpha-methylstyrene, in the preparation of the graft copolymer. Similarly, the R. L. Bergen, Jr., U.S. Pat. No. 3,198,853, referred to previously, shows ABS containing graft copolymer of styrene and acrylonitrile on polybutadiene blended with separately prepared resinous copolymer of alpha-methylstyrene and acrylonitrile. Thus, at column 2, lines 39–42, Bergen, Jr., discloses blending the graft copolymer with a separately prepared resinous copolymer of styrene or alpha-methylstyrene and acrylonitrile. At column 4, lines 6–12, Bergen Jr., discloses a blend of 35 parts of a graft copolymer of 50 parts of styrene and acrylonitrile (ratio 70/30) on 50 parts of polybutadiene rubber, blended with 65 parts of separately prepared resinous copolymer of alpha-methylstyrene and acrylonitrile (ratio 69/31). Any such types of ABS may be employed in this invention.

The invention can also be applied to gum plastics other than ABS polymers such as those made by grafting suitable monomers, such as styrene and acrylonitrile, onto a spine rubber which is a rubbery terpolymer (generally referred to as an "EPDM rubber") of ethylene, propylene and at least one copolymerizable diene such as 1,4-hexadiene, dicyclopentadiene, cyclooctadiene, methylene norbornene, ethylidene norbornene, isopropylidene norbornene or mixtures thereof. See U.S. Pat. No. 3,642,950 for typical preparations.

The urethane polymers or polyurethanes to which this invention can be applied are the conventional polymers which are obtained by the reaction of a polyisocyanate with a polymeric polyol (e.g., a polyether glycol, a polyester glycol, castor oil, or a glycol). Compounds containing such groups as amino and carboxyl may also be used (see, for example, "Encyclopedia of Chemical Technology", 2nd Kirk-Othmer, Interscience Publishers, 1970 Volume 21, page 56-106). A preferred type of urethane polymer is exemplified by the thermoplastic polyurethane elastomers. Examples of these elastomers are the polyether based polyurethanes made from 2 moles of polytetramethylene ether glycol, 3 moles of MDI and 1 mole of 1,4-butanediol, and polyether based polyurethanes similarly derived from 1,4-butanediol-adipic acid based polyurethanes similarly derived from 1,4-butanediol-adipic acid polyester and MDI (Rubber Chemistry and Technology, Volume 35, 1962, page 742, Schollenberger et al). Commercially available polymers of this category include "Estane" (trademark) and "Roylar" (trademark). Many such polymers may be described as reaction products of a polymeric polyol (e.g., a polyester glycol or a polyether glycol) with an organic polyisocyanate, usually a diisocyanate, frequently along with a low molecular weight bifunctional material having two reactive hydrogens, such as a glycol or diamine (see also U.S. Pat. No. 3,462,326, Sturle et al, Aug. 19, 1969, especially column 3, lines 1 to 35).

RIS is extremely compatible with both ABS and urethane polymers and may be blended with either by simple mixing in conventional rubber or plastic mixing machinery, such as an internal mixer of the Banbury type and/or an open mixer of the differential roll mill type, until a uniform mixture is obtained. Elevated temperatures (e.g., 300°–420°F.) aid the mixing, and for best results it is desirable that a temperature sufficiently elevated to flux the materials be reached during at least a part of the mixing cycle. If desired, the materials may first be dry blended, prior to mixing at elevated temperature. The polymer mixture may include additional desired compounding ingredients, such as stabilizers, fillers or pigments, and the like. The RIS is incorporated into the polymers in an effective amount generally from 5 to 35 parts by weight per 100 parts polymer, preferably from 15 to 30 p.p.h. Improved flame retardance can be provided by incorporating metallic compounds, wherein the metal is selected from the group consisting of antimony, arsenic and bismuth, in the polymeric compositions in the amount of about 1 to about 30 parts by weight of said polymeric composition, preferably about 3 to 15 parts by weight.

Antimony trioxide ($Sb_2O_3$) is the metal compound that is presently preferred for use in the present invention. However, many other antimony compounds may be substituted. Suitable antimony compounds include the sulfides of antimony, salts of the alkali metals of Group 1 of the Periodic Table, antimony salts of organic acids and their pentavalent derivatives, the esters of antimonius acids and their pentavalent derivatives. It is convenient to use sodium antimonite or potassium antimonite when it is desired to use an alkali metal salt of the antimony for compositions of this invention. U.S. Pat. No. 2,996,528 discloses suitable antimony salts of organic acids and their pentavalent derivatives. Compounds of this class include antimony butyrate, antimony valerate, antimony caprate, antimony heptylate, antimony caprylate, antimony pelargonate, antimony caprate, antimony cinnate, antimony anisate, and their pentavalent dihalide derivatives. Likewise, the esters of antimonius acids and their pentavalent derivatives disclosed in U.S. Pat. No. 2,993,924 such as tris(n-octyl) antimonite, tris(2-ethylhexyl) antimonite, tribenzyl antimonite, tris (beta-chloroethyl) antimonite, tris(-beta-chlorobutyl) antimonite, and their pentavalent dihalide derivatives. Still other suitable organic antimony compounds are the cyclic antimonites such as trimethylol propane antimonite, pentaerythritol antimonite and glycerol antimonite. The corresponding arsenic and bismuth compounds can also be employed, in particular the oxides of arsenic and bismuth.

The ABS/RIS compositions of this invention exhibit unexpectedly superior flame resistance where compared to hydrocarbon polymeric compositions such as polyethylene/RIS, polypropylene/RIS, and polystyrene/RIS mixtures. In addition, when antimony trioxide is included, the ABS/RIS mixtures are self-extinguishing whereas the polyethylene/RIS and polypropylene/RIS mixtures at the same loadings are not.

The invention is illustrated by the following examples, which are not intended to limit the scope of the invention. Unless otherwise stated all parts are by weight of additive per 100 parts of polymer. All the polymeric compositions were made by first preblending the components at room temperature and then fluxing on a heated (300°–350°F.), two-roll rubber mill using conventional procedures. The mixtures were then compression molded and test pieces were fashioned from the compression moldings. In the examples below, the test pieces were tested for flame retardance in accordance with the following American Society for Testing Materials (ASTM) test procedures; (1) ASTM D635-56T - a horizontal burning rate test (inches/minutes), and (2) ASTM D-2863 - the oxygen index method; also performed was (3) Underwriter's Laboratories Subject 94 (v) (UL-94(v)) a vertical burning test. The several categories of ratings for the UL94(v) test and their meanings are given below.

The physical properties of certain polymeric compositions are tested in accordance with the following American Society for Testing Materials (ASTM) procedures:
Hardness: ASTM D-785-65
Heat Distortion Temperature: ASTM D-648-72
(Using 212 pounds per square inch fiber stress)
Impact Strength, Notched Izod: ASTM D-256-72a

EXAMPLE 1

The unexpected effectiveness of RIS in imparting flame resistance to ABS-type polymers is established by comparison to the flame resistance obtained when used in such hydrocarbon polymers as polyethylene, polypropylene and polystyrene. The sample polymeric mixtures each containing 25 p.p.h. of RIS were hot blended on a conventional two-roll rubber mill at the recommended fluxing temperatures, i.e., between about 300° and 330°F. Test pieces were fashioned from compression moldings of the sample mixtures and were tested for flame resistance as shown in the schedule listed in Table I below.

Table I

| Code | A-0 | A-1 | A-2 | A-3 | A-4 | A-5 | A-6 | A-7 |
|---|---|---|---|---|---|---|---|---|
| Polymer | | | | | | | | |
| ABS(1) | 100 | 100 | — | — | — | — | — | — |
| Polyethylene (2) | — | — | 100 | 100 | — | — | — | — |
| Polypropylene (3) | — | — | — | — | 100 | 100 | — | — |
| Polystyrene (4) | — | — | — | — | — | — | 100 | 100 |
| RIS | — | 25 | — | 25 | — | 25 | — | 25 |
| Burn rate: (in/min) (ASTM D-635) | 1.5 | S.E. | 1.0 | 0.7 | 1.1 | 0.3 | 1.2 | 0.6 |
| Oxygen Index (ASTM D-2863) | 18.5 | 22.3 | 18.4 | 18.7 | 18.4 | 20.6 | 19.2 | 21.6 |

(1) A graft copolymer product containing by weight 22% acrylonitrile, 23% butadiene and 55% styrene.
(2) K60–1000 — High density polyethylene, melt index at 190°C. of 10.0 from Celanese Corporation.
(3) Profax 6623 — General purpose polypropylene, heat stabilized, melt flow ($I_2$ at 230°C.) of 2.0 from Hercules.
(4) Styron 666U — General purpose polystyrene, Vicat softening point of 212°F., melt viscosity of 1,800 poises, melt flow rate of 7.5 g/10 min. from Dow chemical.

| Rating | Meaning |
|---|---|
| SE-O | Extinguishing within 5 seconds —Group O. |
| SE-I | Extinguishes within 30 seconds —Group I - does not drip. |
| SE-II | Extinguishes within 30 seconds —Group II - drips, but does not burn cotton. |
| B-C | Drippings burn cotton and sample extinguishes, both within 30 seconds. |
| B-D | Burning time exceeds 30 seconds and drips. |
| B-ND | Burning time exceeds 30 seconds and no dripping. |

As shown in Table I, RIS at the 25 part level in ABS polymer is self-extinguishing (S.E.) whereas in all three hydrocarbon polymers it is not. This superiority is confirmed by the oxygen index values as measured by the ASTM D-2863 test. As can be seen, the addition of RIS increases the oxygen index value for ABS more than 50 percent higher than it does for the other polymers.

EXAMPLE 2

The superior flame resistance imported by RIS to ABS type polymers is also exhibited in the presence of antimony oxide. Sample polymeric mixtures containing both RIS and antimony oxide were made following the procedure of Example 1 and were tested according to the schedule given in Table II below. The ABS, polyethylene, polypropylene and polystyrene polymers were the same as in Example 1.

Table II

| Code | B-1 | B-2 | B-3 | B-4 | B-5 | B-6 | B-7 | B-8 | B-9 |
|---|---|---|---|---|---|---|---|---|---|
| Polymer | | | | | | | | | |
| ABS Polymer | 100 | — | — | — | 100 | 100 | 100 | 100 | 100 |
| Polyethylene | — | 100 | — | — | — | — | — | — | — |
| Polypropylene | — | — | 100 | — | — | — | — | — | — |
| Polystyrene | — | — | — | 100 | — | — | — | — | — |
| RIS | 15 | 25 | 25 | 25 | 15 | 15 | — | — | — |

Table II-continued

| Code | B-1 | B-2 | B-3 | B-4 | B-5 | B-6 | B-7 | B-8 | B-9 |
|---|---|---|---|---|---|---|---|---|---|
| Chloran | — | — | — | — | — | — | 25 | 15 | 25 |
| $Sb_2O_3$ | 4 | 4 | 4 | 4 | — | 6 | — | 4 | 6 |
| Burn Rate, in/min (ASTM D-635) | N.B. | 0.3 | 0.5 | S.E. | 0.9 | N.B. | 1.4 | 1.51 | N.B. |
| Oxygen Index (ASTM-D-2863) | 23.6 | 20.3 | 23.1 | 22.2 | 20.3 | 24.7 | 21.4 | 22.1 | 24.7 |

As shown in Table II, the unexpected superior performance of RIS in ABS persists in the presence of antimony trioxide. Compositions which fail to burn to the 4-inch mark are designated as "SE" (self-extinguishing), while compositions which fail to burn to the 1-inch mark are designated as "NB" (non-burning). It is important to note that ABS is rendered "non-burning" with only 15 p.p.h. of RIS and 4 p.p.h. of antimony trioxide. Polystyrene requires 25 p.p.h. of RIS and 4 p.p.h. of antimony trioxide to be self-extinguishing. Whereas polyethylene and polypropylene exhibit measureable "burn rates". The superior flame resistance of the ABS composition is confirmed by the oxygen index values.

It is quite apparent that RIS is unexpectedly a much more effective flame retardant either alone or in combination with antimony trioxide in ABS polymer resins that it is in such hydrocarbon polymers as polyethylene, polypropylene and polystyrene.

EXAMPLE 3

Following the procedure of Example 1, the effectiveness of RIS as a flame retardant for ABS polymers was compared with "Cloran" (trademark) which is widely regarded as one of the more effective fire retardants for ABS polymers along with "Dechlorane 25" (trademark). The composition of the polymeric compositions, the flame resistance performance and the physical properties are given in Table III below. The ABS polymer is the same as that used in Example 1.

Table III

| Code | C-1 | C-2 | C-3 | C-4 | C-5 |
|---|---|---|---|---|---|
| Polymer ABS Polymer | 100 | 100 | 100 | 100 | 100 |
| RIS | 24 | — | — | — | — |
| Cloran (3) | — | 24 | 36 | — | — |
| Dechlorane 25(4) | — | — | — | 28 | — |
| $Sb_2O_3$ | 11 | 11 | 11 | 11 | — |
| UL-94 (V-1/16') | SE-O | B-D | SE-O | SE-O | — |
| Oxygen Index (ASTM D-2863) | 31.1 | — | 27.0 | 30.2 | 18.5 |
| Impact, Notched Izod (R.T.) Ft./Lbs. | 1.8 | — | 0.5 | 0.6 | 4.7 |
| Rockwell Hardness, R Scale | 93 | — | 83 | 89 | 94 |
| Heat Distortion Temp., °C. | 84 | — | 83 | 84 | 88 |

(3) 1,2,3,4,9.9-hexachloro-1,4,4a,5,6,7,8,8a-octahydro-1,4-methanonaphthalene-6,7-dicarboxylic anhydride.
(4) 1,4:7,10-dimethanocycloocta-1,2,3,4,7,8,9,10,13,13,14,14-dodecachloro-1,4,4a,5,6,6a,7,10,10,10a,11,12,12a-dodecahydro-1,2:5,6-dibenzene.

As shown in Table III, at the 11 p.p.h. level of $Sb_2O_3$ RIS at the 24 p.p.h. level is significantly superior to Cloran which requires 36 p.p.h. to render the ABS polymer self-extinguishing (Group O) while Dechlorane 25 requires 28 p.p.h. for the same degree of protection. RIS also gives the highest oxygen index (31.1 vs. 27.0 and 30.2). RIS also gives superior impact strength and hardness where compared to Chloran and Dechlorane 25 containing compositions.

EXAMPLE 4

Following the procedure of Example 1, the effectiveness of RIS as a flame retardant in polyurethanes was determined using Roylar, Uniroyal Chemical Polytetramethylene ether glycol based urethane general purpose elastoplastic, Sp. gr. = 1.12, Durometer Hardness (ASTM D-2240) = 85A, Solenoid Brittle Point (ASTM D-746) = <90°F. The results are shown in Table IV below. The ABS Resin, polyethylene and polypropylene polymers were the same as used in previous examples 1 to 3.

Table IV

| Code | D-1 | D-2 | D-3 | D-4 | D-5 | D-6 |
|---|---|---|---|---|---|---|
| Polymer | | | | | | |
| Roylar | 100 | 100 | 100 | — | — | — |
| ABS Polymer | — | — | — | 100 | — | — |
| Polyethylene | — | — | — | — | 100 | — |
| Polypropylene | — | — | — | — | — | 100 |
| RIS | 20 | 20 | — | 24 | 24 | 24 |
| Cloran | — | — | 20 | — | — | — |
| $Sb_2O_3$ | — | 10 | — | 11 | 11 | 11 |
| UL-94 (V-⅛") | B-D | SE-O | B-D | SE-O | B-D | B-D |
| Oxygen Index (ASTM D-2863) | 25.9 | 30.8 | 22.5 | 31.1 | 23.9 | 22.9 |

As shown in Table IV, RIS is an effective flame retardant in polyurethane polymers showing significantly higher oxygen index than Cloran (25.9 vs. 22.5). As with ABS polymers, the flame retardance is considerably enhanced by the inclusion of antimony trioxide which combination results in a self-extinguishing composition. At the 20/10 RIS/$Sb_2O_3$ level, the Roylar composition is substantially equivalent to the 24/11 RIS/$Sb_2O_3$ ABS composition and is unexpectedly superior to both the polyethylene and polypropylene flame retardant compositions at the 24/11 RIS/$Sb_2O_3$ level.

What is claimed is:

1. A flame retardant comprising (1) an organic polymer selected from the group consisting of acrylonitrile-butadiene-styrene polymers and urethane polymers, and (2) an effective flame retardant amount of 2,2',3-,3',4,4',5,5',7,7,7',7'-dodecachloro-1,1',2,2',5,5',6,6'-octahydro-2,2',5,5'-methanobiphenyl.

2. The composition of claim 1 wherein the compound (2) is present in an amount of about 5 to 35 parts by weight per 100 parts by weight of said organic polymer.

3. The composition of claim 1 wherein the compound (2) is present in an amount of about 15 to 30 parts by weight per 100 parts by weight of said organic polymer.

4. The composition of claim 1 wherein the organic polymer is a graft copolymer of acrylonitrile, butadiene and styrene.

5. The composition of claim 1 wherein the organic polymer is a blend of acrylonitrile-butadiene rubber and styrene-acrylonitrile resin.

6. The composition of claim 1 wherein at least a part of the styrene in (1) is replaced by alphamethyl-styrene.

7. The composition of claim 1 wherein at least a part of the acrylonitrile in (1) is replaced by a monomer selected from the group consisting of methacrylonitrile, ethyl acrylate and methyl methacrylate.

8. The composition of claim 1 wherein the organic polymer is a thermoplastic polyurethane elastomer.

9. The composition of claim 8 wherein the polyurethane elastomer is prepared from polytetramethylene ether glycol.

10. The composition of claim 1 additionally containing a compound of antimony.

11. The composition of claim 10 wherein the antimony compound is antimony trioxide.

12. The composition of claim 11 wherein the compound (2) of claim 1 is present in an amount of about 5 to 35 parts by weight per 100 parts by weight of said organic polymer and said antimony compound is present in an amount of about 3 to 15 parts by weight per 100 parts by weight of said organic polymer.

* * * * *